July 12, 1932.  R. J. JAUCH  1,866,653
AUTOMATIC INFLATING DEVICE
Filed Aug. 1, 1929  3 Sheets-Sheet 1
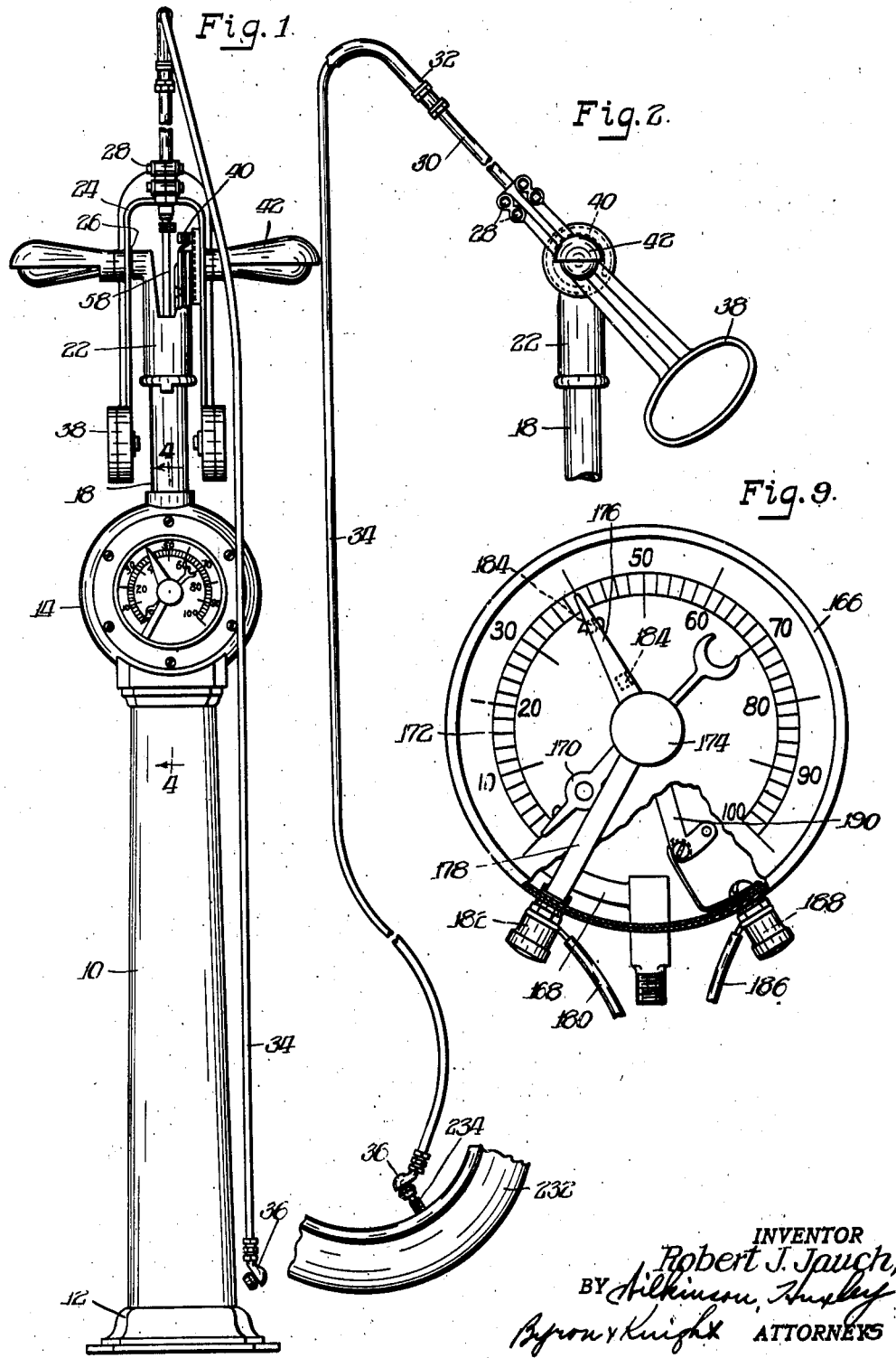

July 12, 1932.   R. J. JAUCH   1,866,653
AUTOMATIC INFLATING DEVICE
Filed Aug. 1, 1929   3 Sheets-Sheet 2

INVENTOR
Robert J. Jauch,
BY Wilkinson, Huxley
Byron Knight   ATTORNEYS.

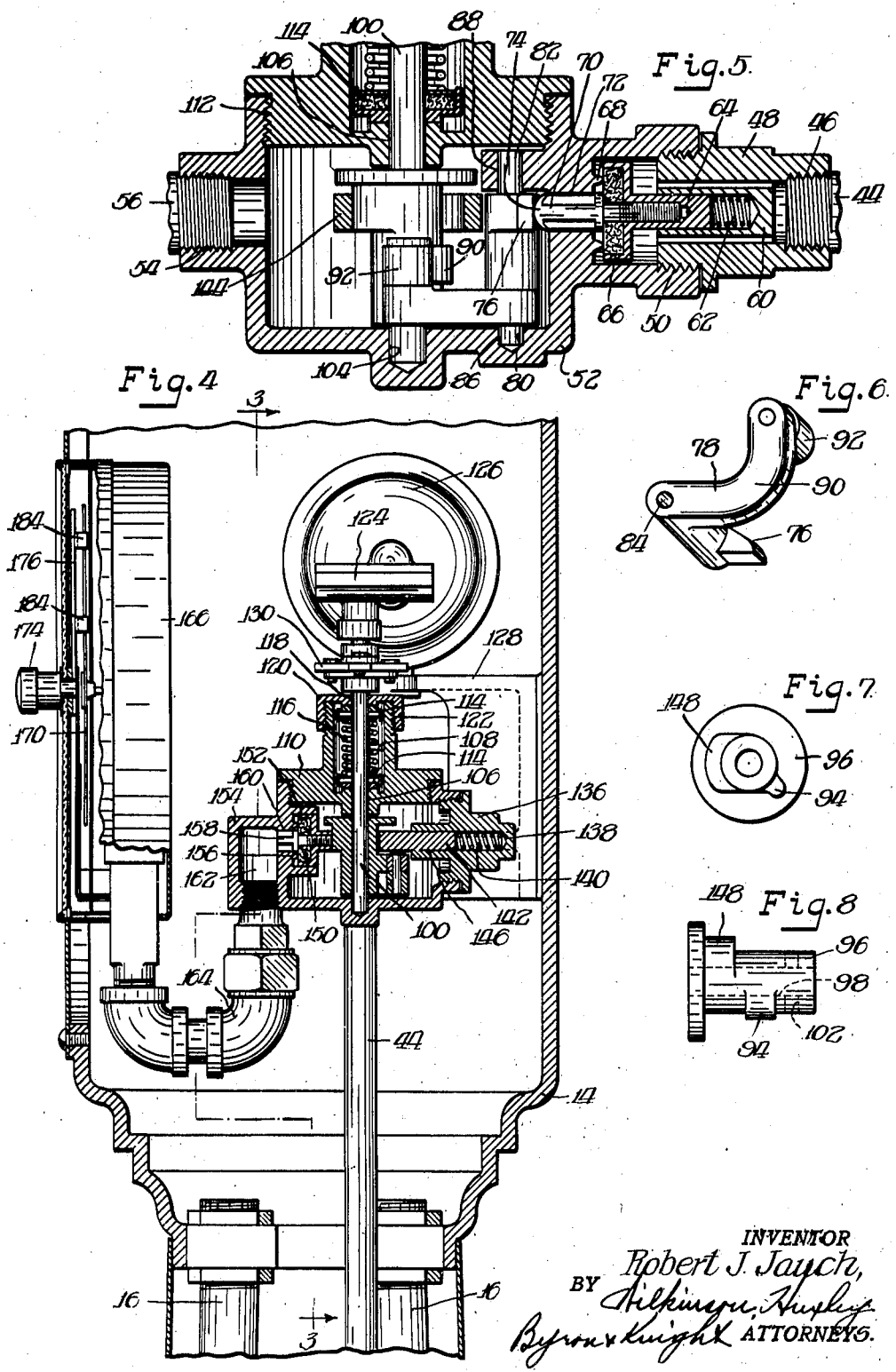

Patented July 12, 1932

1,866,653

UNITED STATES PATENT OFFICE

ROBERT J. JAUCH, OF FORT WAYNE, INDIANA, ASSIGNOR TO WAYNE COMPANY, OF FORT WAYNE, INDIANA, A CORPORATION OF INDIANA

AUTOMATIC INFLATING DEVICE

Application filed August 1, 1929. Serial No. 382,755.

This invention pertains to dispensing apparatus, and more particularly to air towers for supplying compressed air to receptacles, such as pneumatic tires and the like.

There are a great many instances where it is desired to supply a predetermined amount of fluid, as compressed air, to a receptacle, or to maintain the pressure in said receptacle at some predetermined pressure. Probably one of the most outstanding examples is that of inflating or deflating the pneumatic tires of automobiles to a proper pressure commensurate with riding comfort and proper care of the tires. It was formerly the practice to pump up a tire, either by a hand pump or a power operated pump, to an approximate pressure, as by observing how the tire stood on the tread, or after some air had been introduced into the tire, the chuck of the air hose was removed from the tire valve and a gauge applied to the tire valve. The chuck was then reapplied and more air supplied or air bled off from the tire until finally after repeated operations the proper pressure was reached. Manifestly, this is a long and tiresome series of operations. It therefore became necessary and most desirable to provide a device which both supplies and measures the amount or pressure of the air in the tire. This has been attempted in a number of ways, as for instance, through time operated devices or through devices which make use of back pressure and are very complicated or expensive. The cost of such apparatus is very important and it is not economical to have a number of totally independent units supply compressed air where a battery of air towers are used, as in large filling stations.

It is therefore an object of this invention to provide an air dispensing device which is capable of operation using a source of supply in common with other devices, yet one which is self-contained and may be operated jointly or severally with other devices where a plurality of such devices is used.

Another object is to provide an inflator apparatus of the intermittent type which positively inflates, deflates or maintains a predetermined pressure in a receptacle.

Still another object is to provide an inflating device which positively indicates when the device is in operation to supply air to the receptacle being filled.

A further object is to provide an inflator device which is automatic in its operation, which is inexpensive to make and maintain, and fulfills all requirements of manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a front elevation of a device, as an air tower, embodying the invention, a part thereof being broken away for convenience of illustration;

Figure 2 is a fragmentary side elevation of the air tower illustrated in Figure 1, showing the tower in operative relation with a pneumatic tire;

Figure 4 is an enlarged fragmentary sectional side elevation of the device, showing the parts in operative position, the same being taken substantially in the plane as indicated by the line 4—4 of Figure 1;

Figure 5 is an enlarged fragmentary sectional elevation of a portion of the dispensing mechanism, the same being taken substantially normal to corresponding structure shown in Figure 4;

Figure 6 is an enlarged perspective elevation of a portion of the inlet valve operating mechanism described as a bent lever;

Figure 7 is a plan view of a cam member which is a portion of the valve operating mechanism;

Figure 8 is a side elevation of the cam member shown in Figure 7; and

Figure 9 is a front elevation, partly in section, of the dial setting mechanism, a portion being broken away to show the relation of the parts for operating the air tower.

Figure 3:
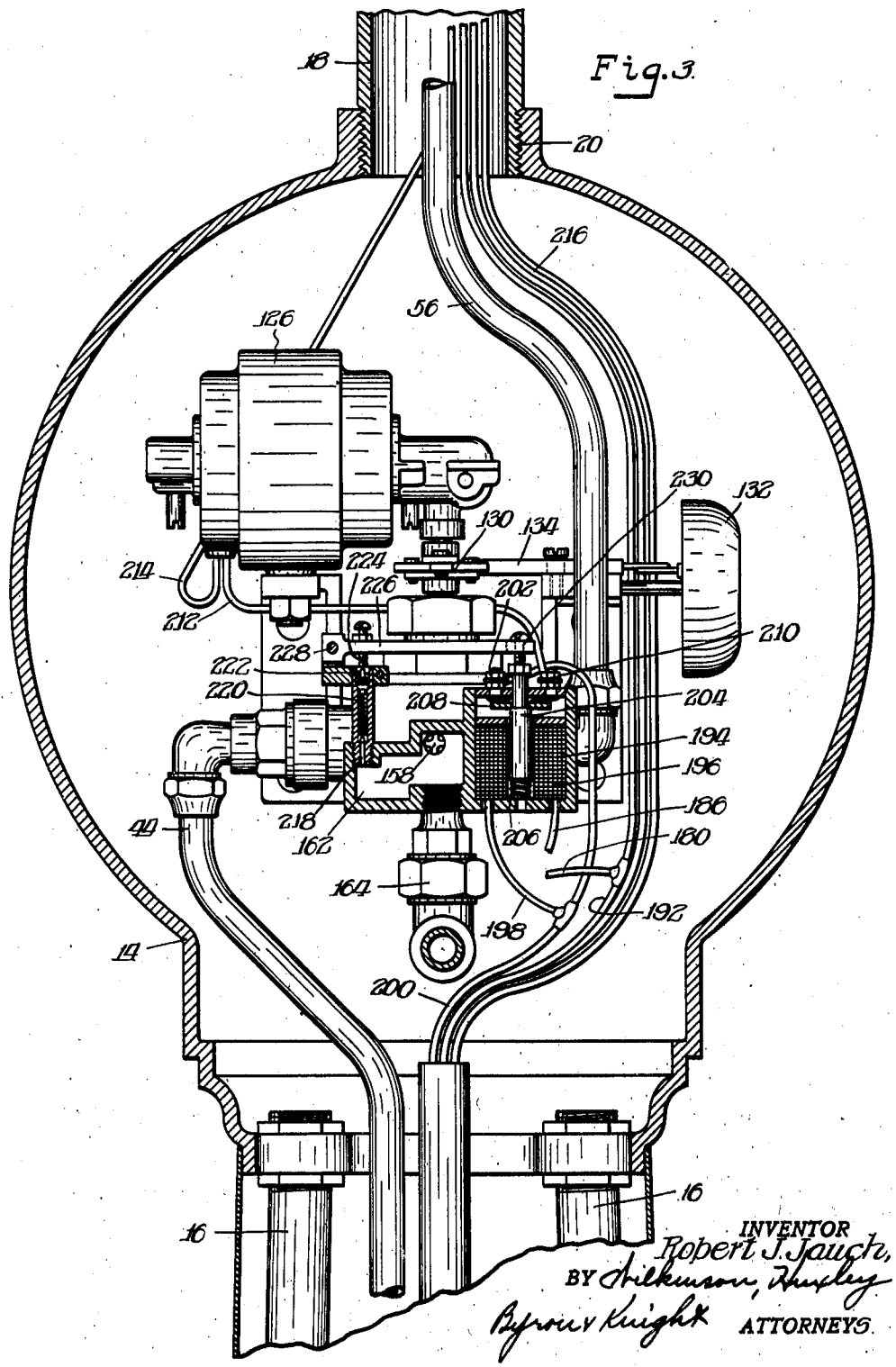
Figure 3 is an enlarged fragmentary sectional front elevation of the device, showing the various parts of the assembly in operative position, the same being taken substantially in the plane as indicated by the line 3—3 of Figure 4.

The embodiment of the device illustrated is a unitary structure for supplying compressed air, as to pneumatic tires, and includes a standard 10 mounted upon a pedestal 12 and secured in supporting relation to the drum 14 as by properly anchored tie rods 16, said drum containing the operating mechanism per se for the air tower structure. An upwardly extending casing 18 is threaded as at 20 into the upper part of the drum and terminates in and forms a support for a bifurcated head portion or member 22 to which the yoke 24 is journaled as at 26. Said yoke provides clamping means 28 for securing the air conduit or discharging means 30 thereto, said conduit terminating in a fitting 32 provided with the air hose 34, to the end of which the tire chuck 36 is secured. The yoke 24 is counterweighted as at 38 to that when the end of the hose or chuck is released, the conduit 30 is moved to a substantially vertical position, in which position a switch member 40 is disconnected from its electrical source of supply, rendering the operating mechanism of the air tower inoperative, it being understood that movement of the chuck or hose in turn moving the conduit 30 out of its vertical position closes contacts of the switch 40 for rendering the operating mechanism operative.

The air tower may be provided with suitable indicia as the lights 42 disposed adjacent the top thereof, preferably at the journals of the yoke 24, which lights may be used either constantly lighted for advertising purposes, or may be connected through the switch 40 whereby they are only lighted when the device is operating.

Compressed air is supplied to the operating mechanism through the conduit or connection 44 connected to a suitable source of supply (not shown), the conduit 44 being threaded as at 46 to the fitting 48, which in turn is threaded as at 50 to a housing 52, said housing being threaded as at 54 to a conduit 56 connected, as by flexible connection 58, to the discharge conduit 30. The fitting 48 is provided with a spider 60 having a spring 62 seated in a pocket therein and in contact with the valve stem 64 of the valve member 66, normally urging said valve member to closed position against its seat 68, it being understood that the valve member 66 is of any suitable material. The valve member is provided with a fluted valve stem 70 slidably mounted in the aperture 72 of the housing 52, said valve stem terminating in a rounded portion 74 adapted to be contacted by the finger 76 of the operating member, which is shown in the form of a bent lever 78. Said bent lever is pivoted as by means of pins 80 and 82 mounted in the aperture 84 and journaled in suitable bearings 86 and 88 provided in the housing 52. The lever is provided with a bent arm 90 having a pivotally mounted roller 92 thereon adapted to have operative engagement with a cam 94 mounted on the cam member 96. The cam member 96 is bored as at 98 to be mounted on the operating shaft 100 for rotation therewith, apertures 102 being provided in the cam member 96 for the reception of the usual securing pin which is adapted to be received in a corresponding aperture provided in the shaft 100.

The shaft 100 is journaled as at 104 in a suitable bearing provided in the housing 52 and passes through a suitable bearing 106 into a stuffing box 108, all provided in the housing 110 which is threaded as at 112 to the housing 52. The stuffing box 108 may be of any construction, such as packed washers 114 spring pressed by means of the spring 116, one toward the bearing 106, and the other toward the bearing 118 provided on the cap 120 threaded as at 122 to the housing 110. The shaft 100 is connected through suitable gearing provided in the housing 124 to a prime mover, such as the electric motor 126, shown as mounted upon the bracket 128 which also serves as anchoring means for the casing 52 and its associated mechanism, the bracket 128 being secured by suitable means to the casing 14. The shaft 100 may be conveniently provided with a dog arrangement 130 serving to intermittently operate a bell or signal 132 through proper mechanism 134, the signal being adapted to operate so long as the motor is running, and consequently so long as the air tower is in operation.

The housing 52 is also provided with a cap 136 preferably threaded thereto, and having a recess 138 therein for the reception of spring 140 having engagement with an elongated guide portion 142 of the yoke 144, said guide portion having sliding engagement in a corresponding guide portion 146 in the cap 136. The head portion of the yoke 144 is provided with a substantially rectangular opening, sides of which are adapted to be consecutively engaged by the cam 148 provided on the cam member 96 for reciprocating said yoke. The yoke is provided with a valve member 150 slidable in guide portions 152 provided in a portion 154 of the fitting 52, said fitting being provided with a valve seat 156 against which the valve 150 is adapted to seat. The valve 150 is also provided with a fluted guide portion 158 slidably mounted in a guide portion 160 provided in the housing portion 154. Movement of the valve 150 then serves to connect and disconnect the conduit 54 from the chamber 162 provided in the portion 154, the chamber 162 being connected through fittings 164 to a pressure control and indicating gauge 166. The gauge is substantially of the well known steam gauge type, having the expansible member 168 in connection with the fittings 166, which expansible member is adapted upon movement thereof to rotate the indicating hand 170 mounted with respect to the scale 172 to indicate the pressures introduced to said gauge. The gauge is provided with a knob 174 for operating the setting hand 176, the hand 176 being in electrical connection through the connector 178 with the electrical conductor 180 through the binding post 182. The setting hand 176 is provided with suitable contacts 184 which are adapted to be closed by the indicating hand 170 whereby electrical connection is established through the conductor 180 and the conductor 186 secured by means of a binding post 188 to a conductor 190 in electrical connection with the proper contact. The conductor 180 is in electrical connection through the conductor 192 to a source of current supply, conductor 192 also being in electrical connection with the switch member 40. The conductor 186 is in electrical connection with a solenoid 194 of a relay 196 mounted in the housing 52.

The connection through the relay is completed by the conductor 198 in electrical connection with the solenoid 194 and the conductor 200 leading from the source of supply and secured to the contact 202. The relay is provided with a plunger 204 having a switch member 208 normally closing connection between the contact 202 and the contact 210, said last named contact being electrically connected to the motor 126 through a conductor 212, the other side of the motor being connected through the conductor 214 to the switch 40 for completing the circuit through conductors 216. The conductor may be connected with the lights 42 and switch 40 if the lights are only to be lighted when the motor is running.

The chamber 162 is adapted to be vented through a bleed 218 normally closed by means of the spring pressed valve 220, which as shown is of the ordinary Schraeder type of bicycle valve, the valve being adapted to be opened by depressing the valve stem 222. This is accomplished by means of the depending finger in the form of an adjusting screw 224 mounted on the lever 226 pivotally mounted as at 228 to the bracket 128, the lever 226 being secured through the loose connection 230 to the plunger 204 of the relay 196.

In operation, when it is desired to fill a receptacle with compressed air, as for instance, the pneumatic tire 232, the pointer 176 is rotated through the knob 174 to set said pointer at the pressure at which the tire is desired to be maintained. Chuck 36 is moved and depressed on the tire valve 234 to effect communication between the tube of the tire 232 and the conduit 30. Sufficient movement of the chuck moves the conduit 30 by means of the hose 34, closing the contacts of the switch 40, lighting the lights 42 and also electrically connecting the source of electrical energy to the motor through the conductor 200, contact 202, switch 208, contact 210, conductor 212, conductor 214 to the switch 40, and through the proper conductors 216 to the source of energy. It will be noticed that as the indicator 170 is not initially at the pressure desired, the solenoid 194 of the relay 196 remains de-energized as the switch contacts 184 are not in electrical connection; therefore the circuit is not completed through the conductors 180 and 186 to conductors 192 and 200.

Assuming that the tire 232 must be inflated, air under pressure is supplied from the source of supply through the conduit 44 around the spider 60 to the normally closed valve 66. However, operation of the motor 126 serves to rotate the shaft 100, thereby rotating the cam member 96, causing the cam 94 to have intermittent abutment with the roller 92. Movement of the cam 94 on the roller 92 serves to partially rotate the arm 78 around its pivots 80 and 82 thereby depressing the finger 76, moving the fluted valve stem 70 to open the valve 66 against the pressure of the spring 62. Opening of this valve permits the compressed air to pass around the valve past the fluted valve stem 70 and into the casing 52, thence at least a portion is supplied to the tire 232 through the conduit 56 and hose 34. When the cam 92 is rotated out of engagement with the roller 92, the spring 62 closes the valve 66 to move the member 78 into a position to be contacted by the cam 94, whereby it is seen that the member 78 is given an oscillatory movement. Rotation of the cam member 96 causes the cam 148 to reciprocate the yoke member 142 to thereby periodically unseat the valve 150. At this point in the operation, the compressed air coming from the compressor is shut off due to the valve 66 being closed, and the air from tire 232 returns through chuck 36, hose 34, conduits 30 and 56, into housing 52. As soon as valve 150 is opened, it permits the passage of a portion of the compressed air to the chamber 162 through the fittings 164 to the expansible member 168 of the gauge 166, causing movement of the pointer 170. It will be seen therefore that the tire pressure is progressively registered each and every time the valve 150 is opened periodically.

It has been found that the small tire valve so commonly used in most tires, will not immediately take all of the air that is supplied from the compressor when the valve 66 is opened; therefore, it is necessary that a sufficient time elapse to allow the charge of air deposited in the housing 52 to filter gradually into the tire. This is permitted by the cam arrangement illustrated particularly in Figures 7 and 8, wherein the cams 94 and 148 are arranged so that when the valve 66 is closed, there is an interval before the valve 150 is opened, this time being necessary to permit the pressure to be supplied gradually from the chamber 52 into the tire.

The opening and closing of the valve 150 prevents by-passing of the total amount of compressed air so that at least a portion thereof is supplied from the casing 52 to the conduit 56, thence through the flexible connection 58 to the conduit 30, from thence to the hose 34 and thence through the hose 34 to the chuck 36 and into the tire 232 through the valve 234. Continued supply through the conduit 44 of course fills the tire, and the intermittent opening and closing of the valves 66 and 150 permits equalization of the pressures in the tire and conduit 56 and consequently the casing 52, so that the gauge 166 properly registers the amount of pressure of the air in the tire 232. When the proper amount of pressure of the compressed air is contained in the tire 232, taken as 40 lbs. in the example, contacts 184 are closed through the pointer 170 whereby current is supplied from the conductor 192, conductor 180, conductor 176, contacts 184 through the pointer 170, conductor 190, conductor 186 to the solenoid 194 of the relay 196 energizing the same, and through the conductors 196 and 200 to the source of supply. Energization of the solenoid 194 of the relay 196 causes movement of the plunger 204 to depress the spring 206, thereby breaking connection between the switch arm 208 and the contacts 202 and 210 whereby electrical connection is severed between the motor and the source of supply, stopping operation of the motor. When the motor circuit is broken, no more current is supplied to the motor, consequently shaft 100, operating the dog arrangement 130, ceases to rotate whereby bell 132 stops ringing and lights 42, when and if used, consequently go out, thereby indicating that the tire is properly filled.

There will, of course, be some compressed air trapped in the gauge, especially when valve 150 is seated, which, however, is released as depressing the plunger 204 moves the arm 226 downwardly or in a clockwise direction, depressing the valve 220 through the plunger 224 whereby the compressed air trapped in the gauge is bled through the bleed 218 to the atmosphere, exhausting the compressed air in the gauge and in the chamber 162.

If the pressure already in the tire 232 is in excess of the pressure for which the gauge 166 is set, the pressure in the conduit 56 through the chuck 36, hose 34 and conduit 30, is directly introduced to the casing 52, and the minute the motor is operated to open the valve 150, even for a short period of time, that pressure is communicated through the chamber 162 and fittings 164 to the gauge, operating the pointer 170 through the member 168 to close the contacts 184 to stop the motor. No more air is supplied to the tire, but air is exhausted until the proper pressure is attained.

It will thus be seen that a very simple yet effective device is provided for automatically determining the proper air pressure or amount of air to be supplied or contained in any container, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In dispensing apparatus, the combination of a source of fluid supply, a discharge conduit having means thereon whereby connection may be made with a receptacle to be maintained at a predetermined pressure, means cooperating with said conduit and said source for regulating the flow of fluid from said conduit and the pressure of fluid in said receptacle, said means including a prime mover, a valve operated by said prime mover for permitting intermittent supply of fluid from said source, a gauge for determining pressures to be maintained in said receptacle, said gauge having selecting means for selecting a pressure to be maintained in said container, a valve operated by said prime mover for permitting intermittent supply of fluid to said gauge, a normally closed switch for controlling operation of said prime mover, a relay connected thereto, and means on said gauge for operating said relay when the predetermined pressure is attained in said receptacle whereby said switch is operated to stop said prime mover for ceasing supply of fluid to said container.

2. In dispensing apparatus, the combination of a source of fluid supply, a discharge conduit whereby connection may be made with a receptacle to be maintained at a predetermined pressure, means for regulating the pressure of fluid in said receptacle, said means including a prime mover and a casing connected to said source and said conduit, a valve in said casing operated by said prime mover for permitting intermittent supply of fluid from said source to said casing, a gauge for determining pressures to be maintained in said receptacle, said gauge having means for selecting a pressure to be maintained in said container, indicating means, a valve in said casing operated by said prime mover for permitting intermittent supply of fluid to said gauge for operating said indicating means, a normally closed switch for controlling operation of said prime mover, a relay connected thereto, and means on said selecting means adapted to be operated by said indicating means for operating said relay when the predetermined pressure is attained in said receptacle whereby said switch is opened to stop said prime mover for ceasing supply of fluid to said container.

3. In dispensing apparatus, the combination of a source of fluid supply, a discharge conduit whereby connection may be made with a receptacle to be maintained at a predetermined pressure, means for regulating the pressure of fluid in said receptacle, said means including a prime mover and a casing connected to said source and said conduit, a valve in said casing operated by said prime mover for permitting intermittent supply of fluid from said source to said casing, a gauge for determining pressures to be maintained in said receptacle, said gauge having means for selecting a pressure to be maintained in said container, indicating means, a valve in said casing operated by said prime mover for permitting intermittent supply of fluid to said gauge for operating said indicating means, a normally closed switch for controlling operation of said prime mover, a relay connected thereto, means on said selecting means adapted to be operated by said indicating means for operating said relay when the predetermined pressure is attained in said receptacle whereby said switch is opened to stop said prime mover for ceasing supply of fluid to said container, and means operated by said relay for exhausting the fluid supplied to said gauge.

4. In dispensing apparatus, the combination of a source of fluid supply, a discharge conduit whereby connection may be made with a receptacle to be maintained at a predetermind pressure, means for regulating the pressure of fluid in said receptacle, said means including a prime mover and a casing connected to said source and said conduit, a valve in said casing operated by said prime mover for permitting intermittent supply of fluid from said source to said casing, a gauge for determining pressures to be maintained in said receptacle, said gauge having means for selecting a pressure to be maintained in said container, indicating means, a valve in said casing operated by said prime mover for permitting intermittent supply of fluid to said gauge for operating said indicating means, a normally closed switch for controlling operation of said prime mover, a relay connected thereto, means on said selecting means adapted to be operated by said indicating means for operating said relay when the predetermined pressure is attained in said receptacle whereby said switch is opened to stop said prime mover for ceasing supply of fluid to said container, and a normally closed valve carried by said casing and operated by said relay when said switch is opened for exhausting fluid supplied to said gauge.

5. In a device for charging a receiver with fluid, the combination with a source of fluid supply, a conduit for connecting the source of supply with the receiver, a member in said conduit having a chamber, a normally closed inlet valve in said chamber, a normally closed outlet valve in said chamber, means for variably measuring the pressure of fluid in said receiver, an operating relay, and means on said last named means adapted to operate said relay whereby the device is rendered inoperative after a predetermined pressure is attained by the fluid in said receiver.

6. In dispensing apparatus, the combination of a source of fluid supply, a discharge conduit having means thereon whereby connection may be made with a receptacle to be maintained at a predetermined pressure, means cooperating with said conduit and said source for regulating the flow of fluid from said conduit and the pressure of fluid in said receptacle, said means including a prime mover, a valve operated by said prime mover for permitting supply of fluid from said source, a gauge for determining pressures to be maintained in said receptacle, said gauge having selecting means for selecting a pressure to be maintained in said container, a valve operated by said prime mover for permitting supply of fluid to said gauge, a normally closed switch for controlling operation of said prime mover, a relay connected thereto, and means on said gauge for operating said relay when the predetermined pressure is attained in said receptacle whereby said switch is operated to stop said prime mover for ceasing supply of fluid to said container.

7. In dispensing apparatus, the combination of a source of fluid supply, a discharge conduit whereby connection may be made with a receptacle to be maintained at a predetermined pressure, means for regulating the pressure of fluid in said receptacle, said means including a prime mover and a casing connected to said source and said conduit, a valve in said casing operated by said prime mover for permitting supply of fluid from said source to said casing, a gauge for determining pressures to be maintained in said receptacle, said gauge having means for selecting a pressure to be maintained in said container, indicating means, a valve in said casing operated by said prime mover for permitting supply of fluid to said gauge for operating said indicating means, a normally closed switch for controlling operation of said prime mover, a relay connected thereto, and means on said selecting means adapted to be operated by said indicating means for operating said relay when the predetermined pressure is attained in said receptacle whereby said switch is opened to stop said prime mover for ceasing supply of fluid to said container 8. In dispensing apparatus, the combination of a source of fluid supply, a discharge conduit whereby connection may be made with a receptacle to be maintained at a predetermined pressure, means for regulating the pressure of fluid in said receptacle, said means including a prime mover and a casing connected to said source and said conduit, a valve in said casing operated by said prime mover for permitting supply of fluid from said source to said casing, a gauge for determining pressures to be maintained in said receptacle, said gauge having means for selecting a pressure to be maintained in said container, indicating means, a valve in said casing operated by said prime mover for permitting supply of fluid to said gauge for operating said indicating means, a normally closed switch for controlling operation of said prime mover, a relay connected thereto, means on said selecting means adapted to be operated by said indicating means for operating said relay when the predetermined pressure is attained in said receptacle whereby said switch is opened to stop said prime mover for ceasing supply of fluid to said container, and means operated by said relay for exhausting the fluid supplied to said gauge.

9. In dispensing apparatus, the combination of a source of fluid supply, a discharge conduit whereby connection may be made with a receptacle to be maintained at a predetermined pressure, means for regulating the pressure of fluid in said receptacle, said means including a prime mover and a casing connected to said source and said conduit, a valve in said casing operated by said prime mover for permitting supply of fluid from said source to said casing, a gauge for determining pressures to be maintained in said receptacle, said gauge having means for selecting a pressure to be maintained in said container, indicating means, a valve in said casing operated by said prime mover for permitting supply of fluid to said gauge for operating said indicating means, a normally closed switch for controlling operation of said prime mover, a relay connected thereto, means on said selecting means adapted to be operated by said indicating means for operating said relay when the predetermined pressure is attained in said receptacle whereby said switch is opened to stop said prime mover for ceasing supply of fluid to said container, and a normally closed valve carried by said casing and operated by said relay when said switch is opened for exhausting fluid supplied to said gauge.

Signed at Fort Wayne, Indiana, this 24th day of July, 1929.

ROBERT J. JAUCH.